United States Patent
Kaneko et al.

(10) Patent No.: US 11,108,290 B2
(45) Date of Patent: Aug. 31, 2021

(54) THREE-PHASE INDUCTION MOTOR AND SECONDARY CONDUCTOR THEREOF

(71) Applicant: MITSUBISHI ELECTRIC CORPORATION, Tokyo (JP)

(72) Inventors: Kenta Kaneko, Tokyo (JP); Kazuaki Otsu, Tokyo (JP); Haruyuki Kometani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 495 days.

(21) Appl. No.: 16/068,915

(22) PCT Filed: Feb. 15, 2016

(86) PCT No.: PCT/JP2016/054341
§ 371 (c)(1),
(2) Date: Jul. 10, 2018

(87) PCT Pub. No.: WO2017/141334
PCT Pub. Date: Aug. 24, 2017

(65) Prior Publication Data
US 2019/0020253 A1 Jan. 17, 2019

(51) Int. Cl.
*H02K 3/12* (2006.01)
*H02K 1/26* (2006.01)
(Continued)

(52) U.S. Cl.
CPC ............... *H02K 3/12* (2013.01); *H02K 1/265* (2013.01); *H02K 17/165* (2013.01); *H02K 1/165* (2013.01);
(Continued)

(58) Field of Classification Search
CPC   H02K 1/165; H02K 1/22; H02K 1/26; H02K 1/265; H02K 3/02; H02K 3/12;
(Continued)

(56) References Cited

U.S. PATENT DOCUMENTS

| 2009/0033180 A1* | 2/2009 | Abe ...................... H02K 11/21 310/68 B |
| 2010/0253174 A1* | 10/2010 | Yabe .................... H02K 17/205 310/212 |

(Continued)

FOREIGN PATENT DOCUMENTS

| JP | 50-110001 A | 8/1975 |
| JP | 06-022515 A | 1/1994 |

(Continued)

OTHER PUBLICATIONS

Iqbal et al., "Electromagnetic Field Analysis of the Performance of Single-Phase Capacitor-Run Induction Motor Using Composite Rotor Conductor", Jun. 2014, Mohd Afaque Iqbal Int. Journal of Engineering Research and Applications, vol. 4 Issue 6, pp. 78-84 (Year: 2014).*

(Continued)

*Primary Examiner* — Alex Torres-Rivera
*Assistant Examiner* — David A. Singh
(74) *Attorney, Agent, or Firm* — Buchanan Ingersoll & Rooney PC

(57) ABSTRACT

A three-phase induction motor includes: a stator having a stator slot having an open slot structure for inserting a formed coil; and a rotor having a rotor slot into which a conductor bar is inserted, the rotor being placed on an inner side of the stator with a clearance between the rotor and the stator. The conductor bar has a polygonal cross-sectional shape having six or more angles, and both end portions of an outer-circumference-side edge surface of the conductor bar are rounded.

18 Claims, 9 Drawing Sheets

(51) Int. Cl.
*H02K 17/16* (2006.01)
*H02K 3/48* (2006.01)
*H02K 3/52* (2006.01)
*H02K 1/16* (2006.01)
*H02K 1/22* (2006.01)

(52) U.S. Cl.
CPC .............. *H02K 1/22* (2013.01); *H02K 3/48* (2013.01); *H02K 3/527* (2013.01); *H02K 2213/03* (2013.01)

(58) Field of Classification Search
CPC .......... H02K 3/48; H02K 3/527; H02K 11/21; H02K 11/215; H02K 11/225; H02K 15/0012; H02K 17/16; H02K 17/165; H02K 2213/03
USPC .................... 310/166, 179, 180, 182, 183
See application file for complete search history.

(56) References Cited

U.S. PATENT DOCUMENTS

| | | | |
|---|---|---|---|
| 2010/0308685 A1 | 12/2010 | Hippen et al. | |
| 2011/0241473 A1* | 10/2011 | Hippen | H02K 3/48 310/211 |
| 2013/0175896 A1* | 7/2013 | Yabe | H02K 17/18 310/211 |
| 2014/0252910 A1* | 9/2014 | Kunihiro | H02K 17/165 310/211 |
| 2016/0164387 A1 | 6/2016 | Komatsu et al. | |

FOREIGN PATENT DOCUMENTS

| | | |
|---|---|---|
| JP | 07-009074 U | 2/1995 |
| JP | 11-027887 A | 1/1999 |
| JP | 2005-237160 A | 9/2005 |
| JP | 2008-278642 A | 11/2008 |
| JP | 2011-078158 A | 4/2011 |
| JP | 2011-087373 A | 4/2011 |
| JP | 2012-253998 A | 12/2012 |
| JP | 5241131 B2 | 7/2013 |
| JP | 2014-176113 A | 9/2014 |
| WO | WO 2013/172120 A1 | 11/2013 |
| WO | 2015093433 A1 | 6/2019 |

OTHER PUBLICATIONS

International Search Report (PCT/ISA/210) dated May 17, 2016, by the Japanese Patent Office as the International Searching Authority for International Application No. PCT/JP2016/054341.
Written Opinion (PCT/ISA/237) dated May 17, 2016, by the Japanese Patent Office as the International Searching Authority for International Application No. PCT/JP2016/054341.
Office Action dated Nov. 8, 2016, by the Japanese Patent Office for Application No. 2016-557675.
Office Action dated Aug. 21, 2019, issued in corresponding Chinese Patent Application No. 201680081045.3, 13 pages including 7 pages of English translation.
Office Action dated Apr. 1, 2020, issued in corresponding Chinese Patent Application No. 201680081045.3, 13 pages including 8 pages of English translation.

* cited by examiner

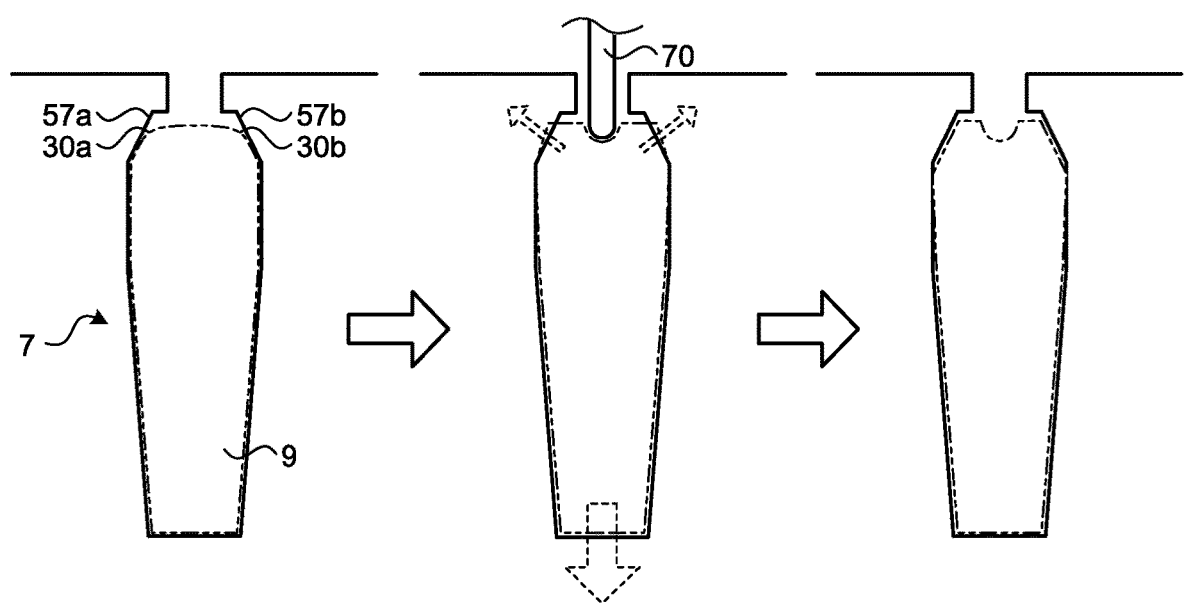

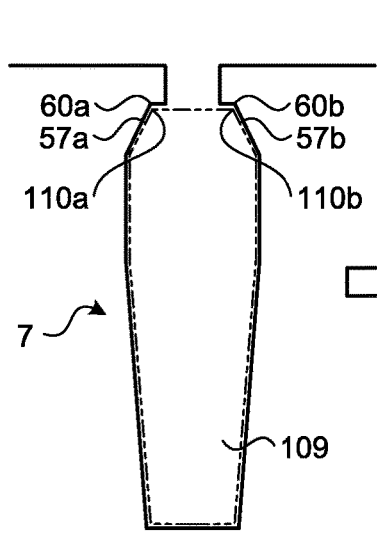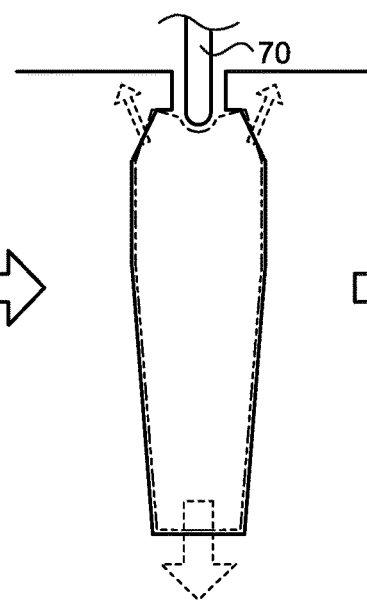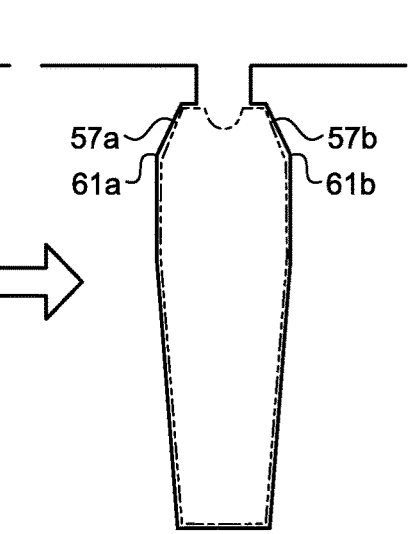

THREE-PHASE INDUCTION MOTOR AND SECONDARY CONDUCTOR THEREOF

FIELD

The present invention relates to a three-phase induction motor and a secondary conductor that is inserted into a rotor slot of the three-phase induction motor.

BACKGROUND

In Patent Literature 1 described below, a three-phase induction motor that has rotor slots into which secondary conductors are inserted is disclosed, and the rotor slots each have a substantially octagonal cross-sectional shape.

Patent Literature 1 does not particularly refer to the cross-sectional shape of the secondary conductors; it is thus assumed that the cross-sectional shape of the rotor slots and the cross-sectional shape of the secondary conductors are identical.

CITATION LIST

Patent Literature

Patent Literature 1: Japanese Patent No. 5241131

SUMMARY

Technical Problem

To insert a secondary conductor into a rotor slot, an operation referred to as swaging is performed. As used herein, swaging is a type of crimping operation performed using a chisel-like tool. Specifically, swaging refers to an operation of pushing a secondary conductor into an opening portion of a rotor slot (hereinafter referred to as "slot opening portion") using a chisel-like tool to thereby cause the secondary conductor to plastically deform and secure it in the rotor slot.

During the swaging, the secondary conductor is pressed from an outer circumferential portion of the rotor toward the center of the rotor; thus, the face of the secondary conductor on the side closer to the center of the rotor is pressed against and secured to the rotor core, and the face of the secondary conductor on the side closer to the outer circumference of the rotor is pressed in the circumferential direction and secured. In this process, how the secondary conductor is deformed and secured depends on the shape of the secondary conductor and the shape of the rotor slot.

When the temperature of the secondary conductor rises as the three-phase induction motor (hereinafter referred to simply as "electric motor" unless stated explicitly) rotates, the secondary conductor expands in the rotor axial direction due to the difference in coefficient of thermal expansion between the secondary conductor and the rotor core. In such a case, because the secondary conductor is pressed against the rotor core by swaging, a force acts to cause the secondary conductor to expand in the axial direction together with the rotor core. If the swaging is excessive, a portion of the secondary conductor that is integrated with the rotor core increases in area and, thus, the force that causes the secondary conductor to expand together with the rotor core is amplified and thereby may cause the rotor core to open at an end portion near a portion that is swaged or cause part of the rotor core to break.

It is thus desirable that the swaging pressure be set to a minimum value that allows the secondary conductor to be secured appropriately. It is necessary however to increase the swaging pressure until the secondary conductor is secured appropriately. If the secondary conductor is not secured appropriately, the torsional natural frequency of a cage shape formed by the secondary conductors and the end rings does not achieve an appropriate value and thus may resonate with a torque pulsation component of the electric motor as the electric motor rotates, causing the rotor core or the secondary conductor to break. There is therefore a demand for a secondary conductor having a shape that can reduce the possibility of a rotor core or the secondary conductor breaking.

The present invention has been achieved in view of the above, and an object of the present invention is to provide a secondary conductor that can reduce the possibility of a rotor core or the secondary conductor breaking and to provide a three-phase induction motor that includes the secondary conductor.

Solution to Problem

To solve the problem described above and achieve the object described above, an aspect of the present invention provides a three-phase induction motor including: a stator having a stator slot having an open slot structure for inserting a formed coil; and a rotor having a rotor slot into which a secondary conductor is inserted, the rotor being placed on an inner side of the stator with a clearance between the rotor and the stator. The secondary conductor inserted into the rotor slot has a polygonal cross-sectional shape having six or more angles, and both end portions of an outer-circumference-side edge surface of the secondary conductor are rounded.

Advantageous Effects of Invention

The present invention produces an effect where a secondary conductor can be firmly held without the swaging pressure being increased and the possibility of a rotor core or the secondary conductor breaking can be lowered.

BRIEF DESCRIPTION OF DRAWINGS

FIGS. 5A to 5C are explanatory diagrams for describing a swaging operation performed on the conductor bar according to the first embodiment that has been inserted in the rotor slot having a substantially octagonal shape.

FIGS. 6A to 6C are explanatory diagrams for describing a swaging operation performed on a conductor bar according to a conventional technique that has been inserted in a rotor slot having a substantially octagonal shape.

DESCRIPTION OF EMBODIMENTS

A three-phase induction motor and its secondary conductor according to embodiments of the present invention are described below in detail with reference to the drawings. The present invention is not limited to the embodiments.

First Embodiment

Figure 1:
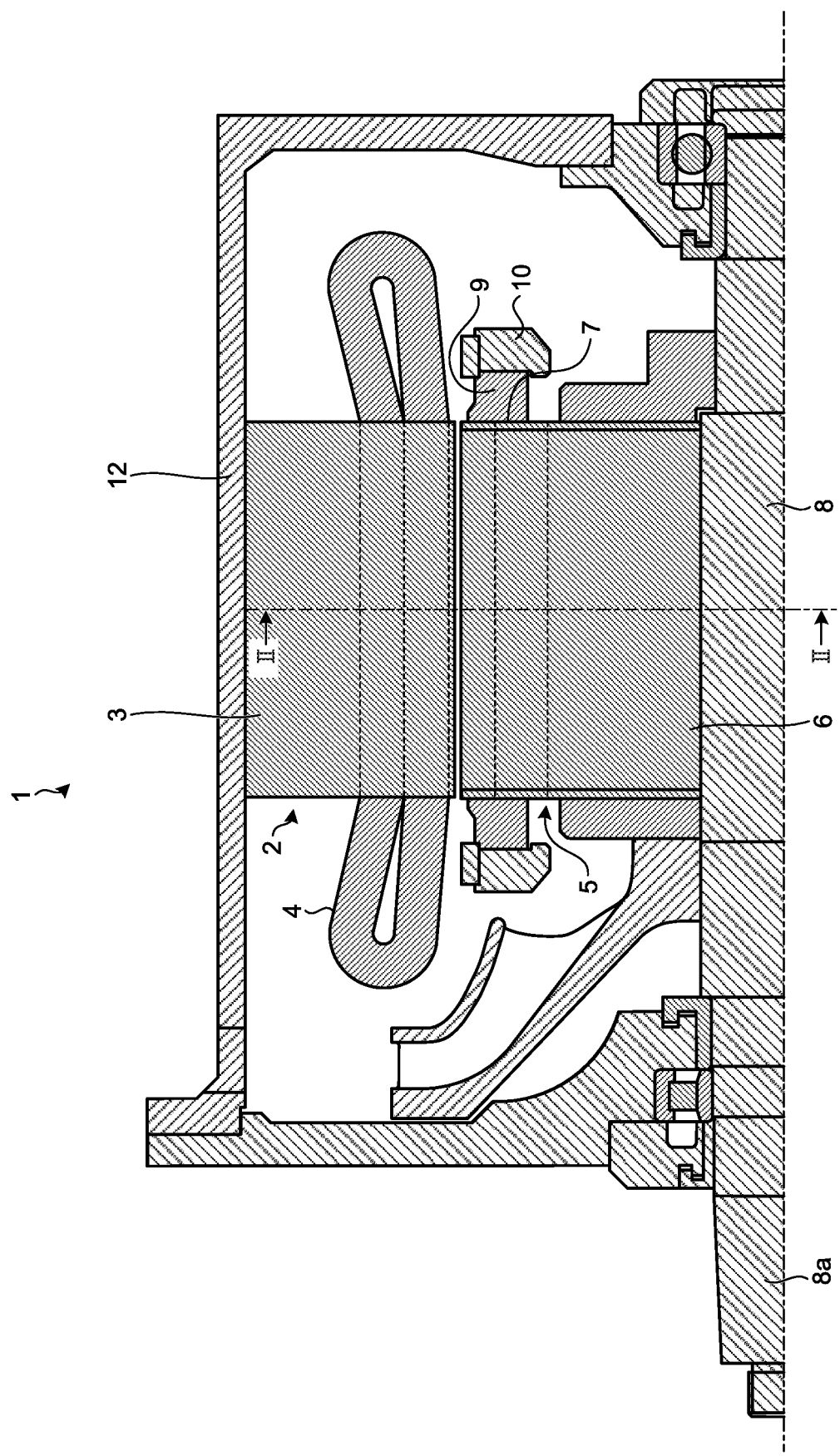
FIG. 1 is a sectional view of a three-phase induction motor according to a first embodiment in the axial direction.
Figure 2:
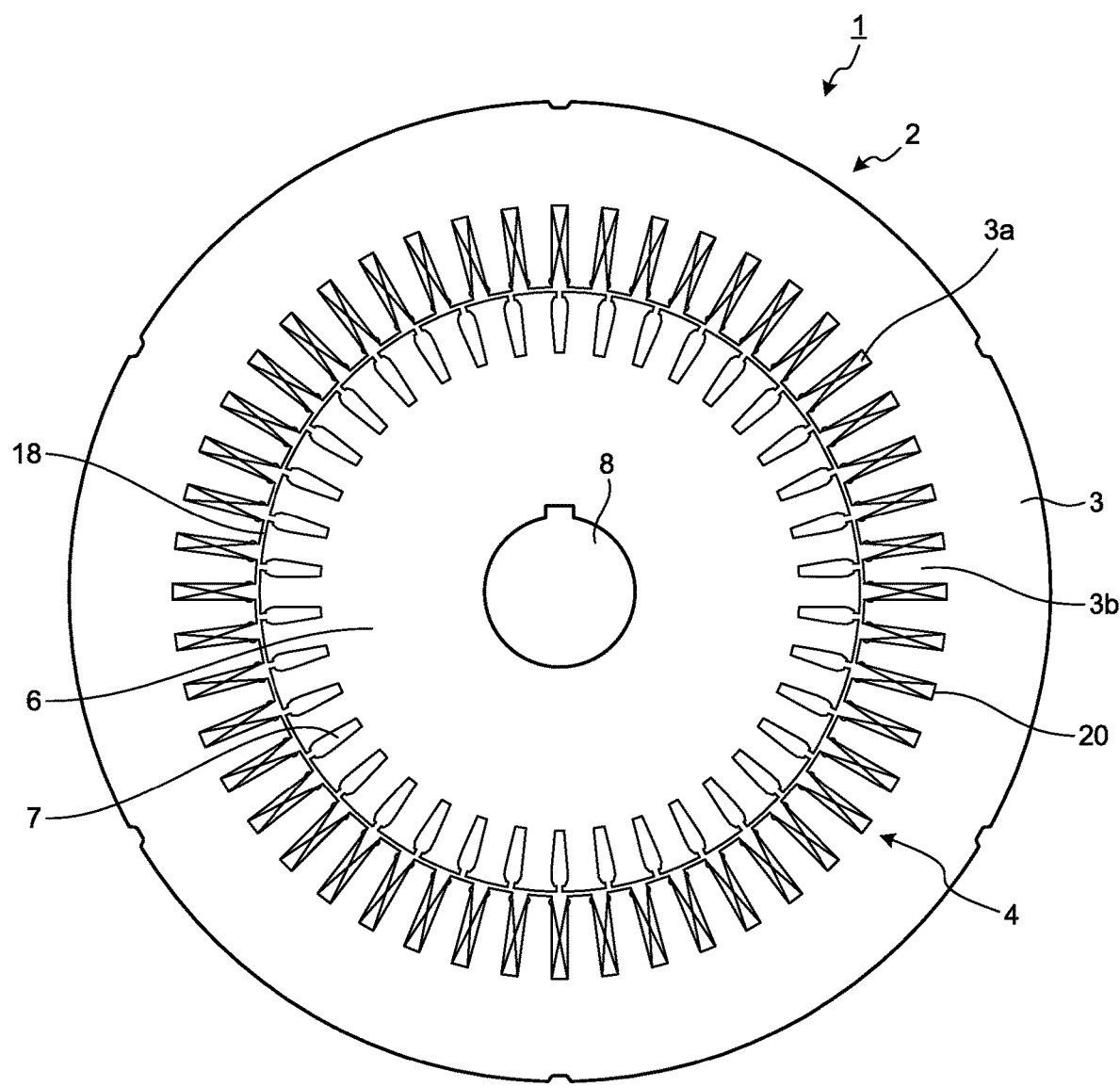
FIG. 2 is a sectional view taken along arrows II-II in FIG. 1.

FIG. 1 is a sectional view of an electric motor 1 according to a first embodiment of the present invention in the axial direction; and FIG. 2 is a sectional view taken along arrows II-II in FIG. 1. A rotor 5, which includes a rotor core 6, is configured on a shaft 8, which is a rotation shaft, and the rotor core 6 includes magnetic steel sheets that are stacked together to form a tubular structure and is integrated with the shaft 8.

The electric motor 1 according to the first embodiment is a motor known as a fully-closed electric motor that is covered by a material that isolates the electric motor 1 from outside air, and the electric motor 1 is suitable as a main electric motor for use in a railroad vehicle. When the electric motor 1 is used in a railroad vehicle, a driving side portion 8a of the shaft 8 is coupled to an axle (not illustrated) of the railroad vehicle via a joint (not illustrated) and a reducing gear (not illustrated) such that the electric motor 1 drives wheels attached to the axle (not illustrated) and thereby causes the vehicle to travel.

A plurality of slot holes (hereinafter referred to as "rotor slots") 7 are formed so as to pass through the rotor core 6 in the axial direction of the shaft 8. A conductor bar 9, which is a conductor having a bar structure, is inserted into each of the rotor slots 7, and end portions of the inserted conductor bars 9 in their longitudinal directions are coupled together by end rings 10. The conductor bars 9 are conductors that configure a secondary-side circuit of the electric motor 1 and are referred to as secondary conductors.

A stator core 3, which has a tubular structure, is placed on the inner side of a frame 12 so as to face the rotor core 6 with a clearance 18 between the stator core 3 and the rotor core 6, and a stator winding 4 is placed on the stator core 3. The stator core 3 and the stator winding 4 configure a stator 2.

FIG. 2 illustrates a preferable sectional structure of the electric motor 1 according to the first embodiment. In FIG. 2, 48 slots 3a are formed intermittently in the stator core 3 on its inner circumferential portion side at equiangular intervals. By forming the 48 slots 3a, 48 teeth 3b are formed. A coil 20 is wound so as to surround one or more teeth 3b and accommodated in each of the slots 3a, which forms a stator slot. The coils 20 accommodated in the slots 3a configure the stator winding 4.

In the rotor core 6, 38 rotor slots 7 are formed so as to face the slots 3a or the teeth 3b of the stator core 3. As described above, the conductor bar 9, which forms the secondary conductor, is inserted into each of the rotor slots 7.

While a case in which the number of stator slots is 48 and the number of rotor slots is 38, that is, a case in which (the number of stator slots)>(the number of rotor slots) is illustrated in FIG. 2 as an example, such a configuration is not a limitation; a case in which (the number of stator slots)<(the number of rotor slots) may be used. A configuration in which the number of stator slots is 36 and the number of rotor slots is 46 is known as an example in which (the number of stator slots)<(the number of rotor slots).

Figure 3:
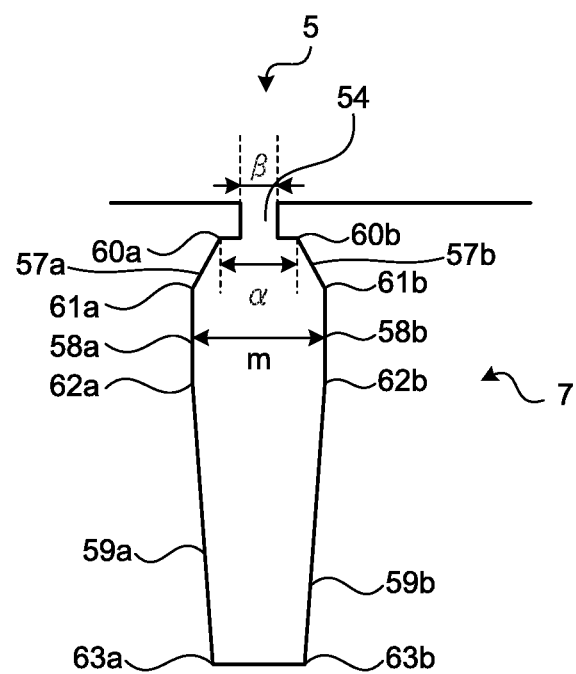
FIG. 3 is a partial sectional view of a cross-sectional shape of a rotor slot of the three-phase induction motor according to the first embodiment.

The cross-sectional shape of each of the rotor slots of the electric motor according to the first embodiment is described next. FIG. 3 is a partial sectional view of a cross-sectional shape of each of the rotor slots of the electric motor according to the first embodiment. The mainstream shape of a rotor slot in a conventional three-phase induction motor is rectangular from the viewpoint of increasing the sectional area of a conductor bar that is inserted into the rotor slot. An increased sectional area of the conductor bar reduces the resistance of the conductor bar, leading to an advantage that copper loss that occurs on the secondary side due to fundamental magnetic flux is reduced.

As illustrated in FIG. 3, each of the rotor slots 7 according to the first embodiment is formed by forming a through hole that has a substantially octagonal cross-sectional shape that has a first tapered portion 57 (57a and 57b), which is formed by tapering a corner portion on the side closer to a slot opening portion 54, a parallel portion 58 (58a and 58b), which extends toward the center of the rotor 5 and has a substantially constant slot width, and a second tapered portion 59 (59a and 59b), which extends further toward the center with the slot width gradually decreasing toward the center. The cross-sectional shape of the rotor slot 7 formed in such a manner has a first corner portion 60 (60a and 60b), a second corner portion 61 (61a and 61b), a third corner portion 62 (62a and 62b), and a fourth corner portion 63 (63a and 63b), where the length between the fourth corner portions 63a and 63b is set so as to be shorter than the length between the third corner portions 62a and 62b (a maximum slot width m). A length α between the first corner portions needs to be longer than a width β of the slot opening portion 54 (hereinafter referred to as slot opening length) in order to inhibit the conductor bar 9 inserted in the rotor slot 7 from vibrating in the slot and from being dislocated by a centrifugal force produced by the rotation of the three-phase induction motor.

Figure 4:
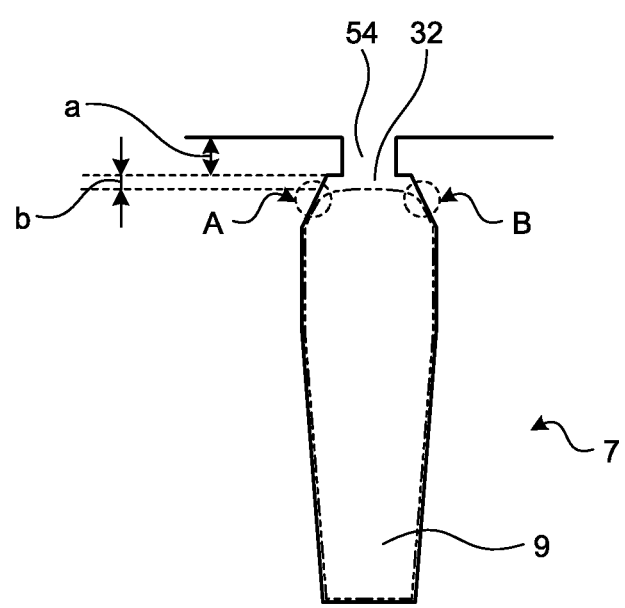
FIG. 4 is a partial sectional view of a cross-sectional shape of a conductor bar of the three-phase induction motor according to the first embodiment.

The cross-sectional shape of the conductor bar of the electric motor according to the first embodiment is described next. FIG. 4 is a partial sectional view of a cross-sectional shape of the conductor bar of the electric motor according to the first embodiment. In FIG. 4, the cross-sectional shape of the rotor slot 7 is indicated with a solid line and the cross-sectional shape of the conductor bar 9 is indicated with a double-dashed-chain line.

The conductor bar according to the first embodiment has mainly four characteristics described below.

(1) The cross-sectional shape of the conductor bar 9 is different from the cross-sectional shape of the rotor slot 7.

(2) Both end portions of an outer-circumference-side edge surface of the conductor bar 9 are rounded (see portions A and B in FIG. 4).

(3) When the conductor bar 9 has been inserted, a gap 32 is formed between the outer-circumference-side edge surface of the conductor bar 9 and the slot opening portion 54.

(4) A radial length "a" of the slot opening portion 54 and a radial length "b" of the gap 32 (that is, the length from the outer-circumference-side edge surface of the conductor bar 9 to an inner circumferential portion side of the slot opening portion 54) satisfy a relationship a>b.

Rounding both of the end portions of the outer-circumference-side edge surface of the conductor bar 9 causes each of the end portions to make surface contact with the rotor core 6; therefore, stress concentration on a contact portion of the rotor core 6 with the conductor bar 9 can be avoided. Since both of the end portions of the outer-circumference-side edge surface of the conductor bar 9 can make surface contact with the rotor core 6, concentration of eddy current due to point contact can be avoided.

By providing the gap 32 between the outer-circumference-side edge surface of the conductor bar 9 and the slot opening portion 54, an amount of fringing magnetic flux that crosses the slot opening portion 54 and the conductor bar 9 can be reduced. Increasing the radial length of the gap 32 reduces the sectional area of the conductor bar 9, thereby increasing secondary resistance. Thus, as described above, the radial length of the gap 32 is preferably reduced so as to be shorter than the radial length of the slot opening portion 54.

Harmonic losses caused when the three-phase induction motor is driven using an inverter and the structure of a rotor that is affected by the harmonic losses are described next.

Harmonic losses caused in an electric motor driven using an inverter include a harmonic loss that is caused by a harmonic component included in a voltage waveform applied to the electric motor, that is, a harmonic voltage (generally referred to as "inverter harmonic loss") and a harmonic loss that is caused by a space harmonic caused inside the electric motor (generally referred to as "space harmonic loss").

A space harmonic loss is generally categorized into a stator slot harmonic that is generated by permeance pulsation at slot portions and teeth portions of a stator and a stator magnetomotive force harmonic that is generated due to the magnetomotive force changing in steps because of the stator windings accommodated in the slots.

The stator magnetomotive force harmonic is generally considered small if the number of slots for each pole and each phase is two or greater. The stator slot harmonic is the dominant space harmonic of the space harmonic loss. The electric motor according to the first embodiment has a similar structure. An open slot structure is employed for opening portions of stator slots from the viewpoint of improving the case of inserting coils especially when the coils are formed coils; in such cases, the stator slot harmonic is notably increased.

Additionally, the stator slot harmonic affects the rotor slots. This is because when opening portions of stator slots have open slot structures, a large part of the pulsation component of magnetic flux due to the stator slot harmonic is received between conductors in the adjacent rotor slots, and thereby the harmonic loss increases.

A known technique skews a secondary conductor in the axial direction for the purpose of reducing the harmonic loss as described above; however, skewing in the axial direction is difficult if the material of the secondary conductor is metal. In an electric motor having a structure in which secondary conductors are not skewed in the axial direction, a large amount of harmonic current is thus induced in the secondary conductors, which are conductor bars inserted into rotor slots.

The shape of the rotor slot illustrated in FIG. 3 is effective in reducing the stator slot harmonic for an electric motor having a structure in which secondary conductors are not skewed in the axial direction. If, however, a conductor bar is fabricated into a shape that agrees with the shape of the rotor slot illustrated in FIG. 3 and inserted into the rotor slot, the rotor core or the secondary conductor may be broken during the swaging operation, as described in "Technical Problem." To counter this, the shape of the conductor bar illustrated in FIG. 4 is devised to prevent the rotor core and the secondary conductor from breaking.

Figure 7:
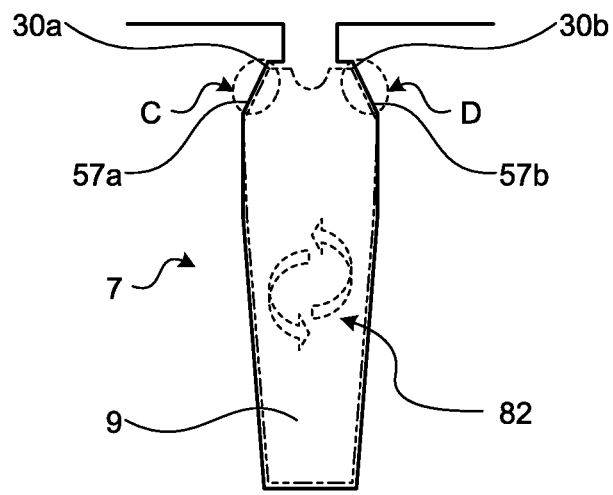
FIG. 7 is an explanatory diagram for describing a stress that acts on the conductor bar according to the first embodiment that has been inserted in the rotor slot having a substantially octagonal shape.
Figure 8:
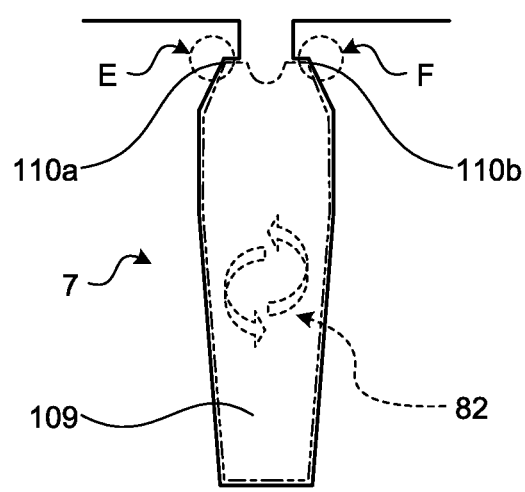
FIG. 8 is an explanatory diagram for describing a stress that acts on the conductor bar according to the conventional technique that has been inserted in the rotor slot having a substantially octagonal shape.
Figure 9:
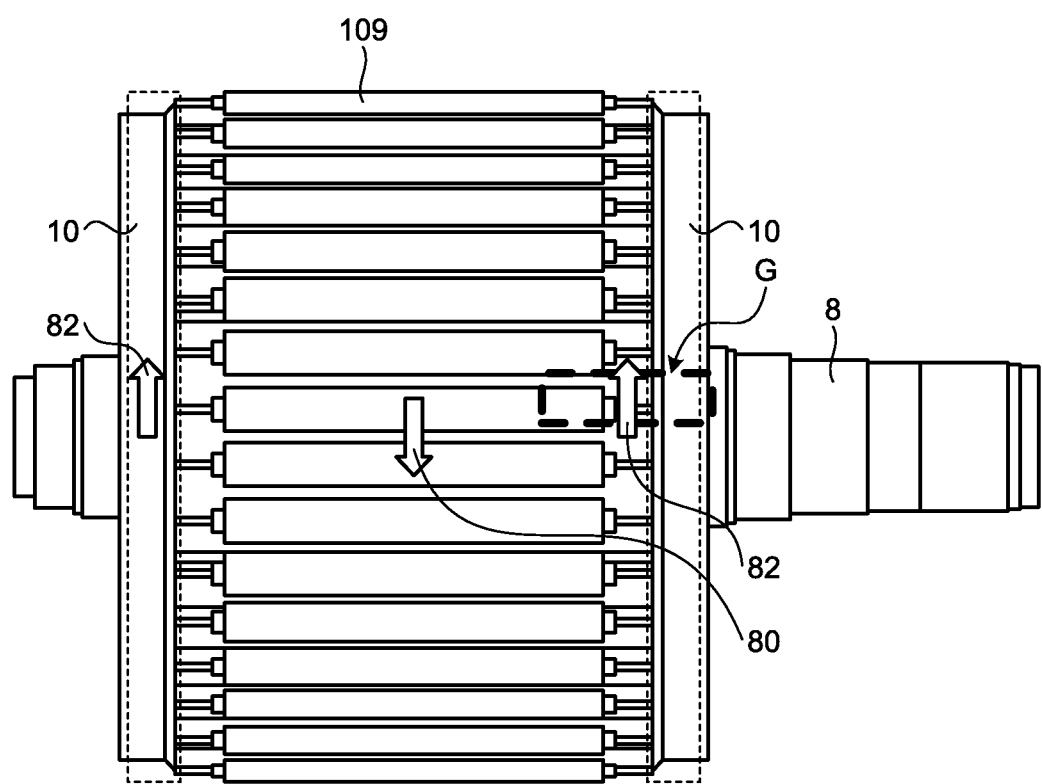
FIG. 9 is a side view of a rotor for describing a twist due to torque pulsation of the three-phase induction motor.
Figure 10A:
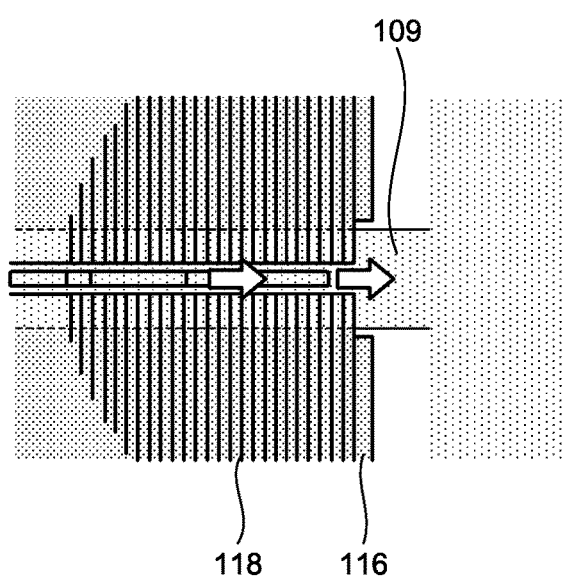
FIGS. 10A to 10C are explanatory diagrams illustrating a possible state inside a rotor when the swaging pressure applied to a conductor bar during a swaging operation is too high.
Figure 10B:
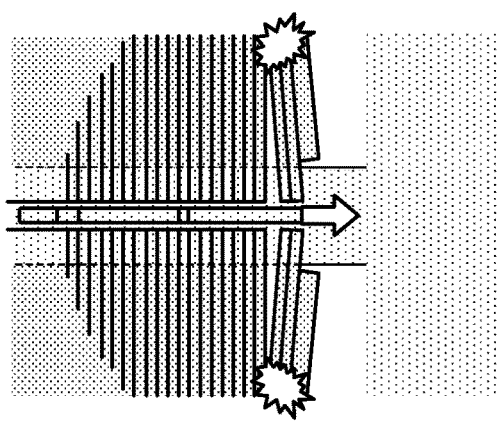
Figure 10C:
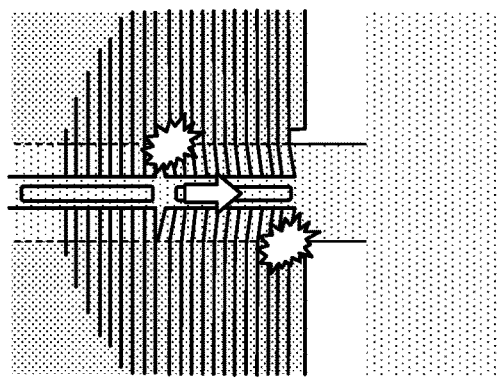

An effect that the conductor bar according to the first embodiment uniquely produces is described next with reference to FIGS. 5A to 10C. FIGS. 5A to 5C are explanatory diagrams for describing a swaging operation performed on the conductor bar according to the first embodiment that has been inserted in the rotor slot having a substantially octagonal shape; and FIGS. 6A to 6C are explanatory diagrams for describing a swaging operation performed on a conductor bar according to a conventional technique that has been inserted in a rotor slot having a substantially octagonal shape. FIG. 7 is an explanatory diagram for describing a stress that acts on the conductor bar according to the first embodiment that has been inserted in the rotor slot having a substantially octagonal shape; and FIG. 8 is an explanatory diagram for describing a stress that acts on the conductor bar according to the conventional technique that has been inserted in the rotor slot having a substantially octagonal shape. FIG. 9 is a side view of a rotor for describing a twist due to torque pulsation of a three-phase induction motor; and FIGS. 10A to 10C are explanatory diagrams illustrating a possible state inside a rotor when a pressure applied to a conductor bar during a swaging operation (hereinafter referred to as "swaging pressure") is too high.

When a swaging operation is performed on the conductor bar according to the first embodiment, a state in FIG. 5A transitions to a state in FIG. 5B. Due to the swaging pressure applied using a chisel-like tool 70 during the operation, a force acts on the conductor bar 9 and presses the conductor bar 9 toward the rotor center, while a force also acts on a first end portion 30 (30a and 30b), which represents both of the end portions of the outer-circumference-side edge surface of the conductor bar 9. Since the first end portion 30 (30a and 30b) is rounded, it is possible to prevent such a situation that a corner portion of the conductor bar 9 comes into contact with the core. Additionally, plastic deformation of the conductor bar 9 is directed toward the outer circumference side of the rotor along the first tapered portion 57 (57a and 57b) of the rotor slot 7; thus stress concentration on the rotor slot 7 can be avoided. As described above, the conductor bar according to the first embodiment can be accommodated in the rotor slot 7 with no vacant space as illustrated in FIG. 5C or with a small vacant space.

In contrast, when a swaging operation is performed on a conductor bar according to a conventional technique, that is, a conductor bar that has the same shape as the rotor slot 7, a state in FIG. 6A transitions to a state in FIG. 6B. Due to the swaging pressure applied using the chisel-like tool 70 during the operation, a force acts on a conductor bar 109 and presses the conductor bar 109 toward the rotor center, while a force also acts on a corner portion 110 (110a and 110b), which represents both of the end portions of the outer-circumference-side edge surface of the conductor bar 109. The corner portion 110 (110a and 110b) of the conductor bar 109 thus makes point or line contact, instead of surface contact, with the first corner portion 60 (60a and 60b) of the rotor slot 7 or the first tapered portion 57 (57a and 57b) of the rotor slot 7. Thus, as illustrated in FIG. 6C, the first tapered portion 57 (57a and 57b) of the rotor slot 7 may be pressed in the outer circumference direction and deformed by the corner portion 110 (110a and 110b) of the conductor bar 109, and a vacant space may be created near the second corner portion 61 (61*a* and 61*b*) of the rotor slot 7.

FIGS. 7 and 8 illustrate states in which centrifugal forces are applied to the conductor bars when the electric motors rotate. When torque pulsation is produced in the electric motor 1 rotating in a rotation direction 80 with a centrifugal force acting on the conductor bars 9, a force in a direction that twists the conductor bar 9 (hereinafter referred to as "twisting force") 82 acts on the end rings 10 as illustrated in FIG. 9.

In the case of the conductor bar 9 according to the first embodiment, the first end portion 30 (30*a* and 30*b*) of the conductor bar 9 and a portion of the conductor bar 9 around the first end portion 30 are in surface-contact with and secured to the first tapered portion 57 (57*a* and 57*b*) of the rotor slot 7, as indicated by portions C and D in FIG. 7, and thereby an improved securing strength over a conventional strength can be provided; thus, the securing strength against a centrifugal force due to the rotation of an electric motor can be enhanced, and an appropriate securing strength can be obtained without the swaging pressure being increased. Additionally, tolerance to the twisting force 82 as illustrated in FIG. 9 can be raised. Moreover, an amount of deformation in the conductor bar 9 can be reduced, which facilitates configuring the rotor uniformly and can contribute to quality improvement of the electric motor.

In the case of the conductor bar 109 according to the conventional technique, the corner portion 110 (110*a* and 110*b*) of the conductor bar 109 is in point-contact with and secured to the rotor slot 7 as indicated by portions E and F in FIG. 8; thus, tolerance to the twisting force 82 as illustrated in FIG. 9 needs to be maintained by increasing the swaging pressure. When the conductor bar 109 is secured using an increased swaging pressure, the conductor bar 109 may not be secured appropriately. If the conductor bar 109 is not secured appropriately, the torsional natural frequency of a cage shape formed by the conductor bars 109 and the end rings 10 does not achieve an appropriate value and thus may resonate with a torque pulsation component of the electric motor as the electric motor rotates, causing failures as illustrated in FIGS. 10A to 10C. FIGS. 10A to 10C are expanded views illustrating a state inside a portion G indicated with a broken line in FIG. 9 that can occur in the conductor bar 109 according to the conventional technique inside the rotor when the swaging pressure is too high.

When the conductor bar 109 that is secured using a high swaging pressure is heated and undergoes thermal expansion due to the rotation of the electric motor, a force acts to cause the conductor bar 109 to expand together with the rotor core as illustrated in FIG. 10A. In particular, a force to open the rotor core acts on the boundary of an area on which the swaging operation has been performed. If the force to open the rotor core continues to act and exceeds an allowable value of a rotor core retainer 116 at a rotor end portion, the rotor core opens and magnetic steel sheets 118 of the rotor core may be broken or only a thin portion of the magnetic steel sheets 118 at an end portion of the rotor core may be entangled and deformed as illustrated in FIGS. 10B and 10C.

In contrast, the conductor bar 9 according to the first embodiment can keep the swaging pressure low; therefore, unlike the case described above, the magnetic steel sheets of the rotor core can be inhibited from breaking and deforming.

While an example is provided in FIG. 3 in which each of the rotor slots 7 is formed by forming a through hole having a substantially octagonal shape, the rotor slots 7 may have a shape that has no second tapered portion 59 and the conductor bars 9 may be formed to have a cross-sectional shape conforming to this shape. For example, each of the rotor slots 7 may have a substantially hexagonal cross-sectional shape in which the parallel portion 58, which has a substantially constant slot width, extends from the first corner portion 60 (60*a* and 60*b*) to the third corner portion 62 (62*a* and 62*b*) and the second corner portion 61 (61*a* and 61*b*) is not formed. In this case, it is sufficient if the conductor bars 9 also have a substantially hexagonal cross-sectional shape and both of the end portions of the outer-circumference-side edge surface of the conductor bar 9 are rounded. An important point is that as long as the conductor bar 9 has a structure that causes both of the end portions of the outer-circumference-side edge surface of the conductor bar 9 to make surface contact with a tapered portion formed on the outer circumference side of the rotor slot 7, it is included in the spirit of the present invention.

As described above, the conductor bar, which is the secondary conductor included in the three-phase induction motor according to the first embodiment, has a polygonal cross-sectional shape having six or more angles, and both of the end portions of the outer-circumference-side edge surface of the secondary conductor are rounded; thus, the three-phase induction motor can firmly hold the secondary conductors without increasing the swaging pressure and can lower the possibility of a rotor core or the secondary conductor breaking.

Second Embodiment

A material of the conductor bars of the three-phase induction motor according to a second embodiment is described below. As described in the first embodiment, the conductor bars are required to have enough strength to withstand a centrifugal force generated when the rotor rotates. A conventional conductor bar is thus generally made of a copper alloy. When a copper alloy is used to make a conductor bar, a manufacturing method referred to as a cold drawing process is used to make the conductor bar. In the cold drawing process, a material is pushed into a die and then drawn out. In the cold drawing process, high strength can be obtained by using an appropriate processing ratio, which is a ratio of the amount of material to be pushed into a die, and by performing an aging treatment, which is a heat treatment performed after drawing out the material, at an appropriate temperature for an appropriate time. The cold drawing process, however, is problematic in that, although its accuracy is high when the shape of a conductor bar is simple, distortion occurs during the drawing process when the shape of a conductor bar is complex. This distortion results from a difference in rolling reduction due to asymmetry of the cross-sectional shape. Since the conventional mainstream cross-sectional shape is rectangular, a distortion of even a high strength copper alloy is corrected relatively easily; however, a polygonal shape makes the operation to correct a distortion difficult and also has a disadvantage in that machinability is poor.

The conductor bar according to the second embodiment is made of pure copper because it facilitates the operation to correct a distortion and requires no aging treatment. Although pure copper, which is not an alloy, does not offer an increased strength through an aging treatment, use of the shape of the conductor bar according to the first embodiment can obtain strength in the conductor bar when it is inserted in and secured to the rotor slot.

Pure copper, which is a material having a low loss, is preferable for improvement in efficiency. Additionally, rounding the outer-circumference-side edge surface of the conductor bar enables reduction in harmonic secondary copper loss of the rotor, that is, a harmonic loss due to permeance pulsation at the slot portions and the teeth portions; therefore, pure copper is a preferable material for improvement in efficiency.

While a case has been described in which the three-phase induction motor according to the present embodiment is used as a main electric motor for use in a railroad vehicle, the three-phase induction motor may be used for other uses.

The configurations in the embodiments described above represent some examples of the present invention, and they can be combined with another publicly known technique and partially omitted or modified without departing from the spirit of the present invention.

REFERENCE SIGNS LIST 1 electric motor (three-phase induction motor); 2 stator; 3 stator core; 3a slot; 3b teeth; 4 stator winding; 5 rotor; 6 rotor core; 7 rotor slot; 8 shaft; 8a driving side portion; 9 conductor bar; 10 end ring; 12 frame; 18 clearance; 20 coil; 30 (30a, 30b) first end portion; 32 gap; 54 slot opening portion; 57 (57a, 57b) first tapered portion; 58 (58a, 58b) parallel portion; 59 (59a, 59b) second tapered portion; 60 (60a, 60b) first corner portion; 61 (61a, 61b) second corner portion; 62 (62a, 62b) third corner portion; 63 (63a, 63b) fourth corner portion; 70 chisel-like tool; 80 rotation direction; 82 twisting force; 109 conductor bar; 110 (110a, 110b) corner portion; 116 rotor core retainer; 118 magnetic steel sheet.

The invention claimed is:

1. A three-phase induction motor, comprising:
a stator having a stator slot having an open slot structure for inserting a formed coil; and
a rotor having a rotor slot into which a secondary conductor is inserted, the rotor being placed on an inner side of the stator with a clearance between the rotor and the stator, the rotor slot having a polygonal cross-sectional shape having six or more angles, wherein
the secondary conductor has a polygonal cross-sectional shape having six or more angles that is different from the cross-sectional shape of the rotor slot, and both end portions of an outer-circumference-side edge surface of the secondary conductor are rounded,
a portion of the outer-circumference-side edge surface other than the both end portions makes no contact with the rotor,
the both end portions make surface contact with a tapered portion formed on an outer circumference side of the rotor slot, and
when the secondary conductor is inserted in the rotor slot, a slot opening portion is placed on an outer circumferential surface side of the rotor slot and a gap is formed between the slot opening portion and the outer-circumference-side edge surface.

2. The three-phase induction motor according to claim 1, wherein,
a radial length of the slot opening portion is longer than a radial length of the gap.

3. The three-phase induction motor according to claim 2, wherein a material of the secondary conductor is pure copper.

4. The three-phase induction motor according to claim 3, wherein the three-phase induction motor is used as a main electric motor for use in a railroad vehicle.

5. The three-phase induction motor according to claim 4, wherein the three-phase induction motor is a fully-closed electric motor.

6. The three-phase induction motor according to claim 3, wherein the three-phase induction motor is a fully-closed electric motor.

7. The three-phase induction motor according to claim 2, wherein the three-phase induction motor is used as a main electric motor for use in a railroad vehicle.

8. The three-phase induction motor according to claim 7, wherein the three-phase induction motor is a fully-closed electric motor.

9. The three-phase induction motor according to claim 2, wherein the three-phase induction motor is a fully-closed electric motor.

10. The three-phase induction motor according to claim 1, wherein a material of the secondary conductor is pure copper.

11. The three-phase induction motor according to claim 10, wherein the three-phase induction motor is used as a main electric motor for use in a railroad vehicle.

12. The three-phase induction motor according to claim 11, wherein the three-phase induction motor is a fully-closed electric motor.

13. The three-phase induction motor according to claim 10, wherein the three-phase induction motor is a fully-closed electric motor.

14. The three-phase induction motor according to claim 1, wherein the three-phase induction motor is used as a main electric motor for use in a railroad vehicle.

15. The three-phase induction motor according to claim 14, wherein the three-phase induction motor is a fully-closed electric motor.

16. The three-phase induction motor according to claim 1, wherein the three-phase induction motor is a fully-closed electric motor.

17. A secondary conductor for use in a three-phase induction motor, the motor comprising:
a stator having a stator slot having an open slot structure for inserting a formed coil; and
a rotor having a rotor slot and placed on an inner side of the stator with a clearance between the rotor and the stator, the rotor slot having a polygonal cross-sectional shape having six or more angles, the secondary conductor being inserted in the rotor slot so as to configure a part of the three-phase induction motor, wherein
the secondary conductor has a polygonal cross-sectional shape having six or more angles that is different from the cross-sectional shape of the rotor slot, and both end portions of an outer-circumference-side edge surface of the secondary conductor are rounded,
a portion of the outer-circumference-side edge surface other than the both end portions makes no contact with the rotor,
the both end portions make surface contact with a tapered portion formed on an outer circumference side of the rotor slot, and
when the secondary conductor is inserted in the rotor slot, a slot opening portion is placed on an outer circumferential surface side of the rotor slot and a gap is formed between the slot opening portion and the outer-circumference-side edge surface.

18. The secondary conductor for use in a three-phase induction motor according to claim 17, wherein a material of the secondary conductor is pure copper.

* * * * *